(12) United States Patent
Glenn

(10) Patent No.: US 9,903,521 B2
(45) Date of Patent: Feb. 27, 2018

(54) UPSTREAM PIPE PLUG

(71) Applicant: Richard L. Glenn, Charlotte, NC (US)

(72) Inventor: Richard L. Glenn, Charlotte, NC (US)

( * ) Notice: Subject to any disclaimer, the term of this patent is extended or adjusted under 35 U.S.C. 154(b) by 577 days.

(21) Appl. No.: 14/503,945

(22) Filed: Oct. 1, 2014

(65) Prior Publication Data
US 2016/0097480 A1 Apr. 7, 2016

(51) Int. Cl.
*F16L 55/10* (2006.01)
*F16L 55/12* (2006.01)
*F16L 55/128* (2006.01)
*F16L 55/134* (2006.01)

(52) U.S. Cl.
CPC ....... *F16L 55/1003* (2013.01); *F16L 55/1283* (2013.01); *F16L 55/134* (2013.01)

(58) Field of Classification Search
CPC .................. F16L 55/1003; F16L 55/1283
USPC .................................. 138/89, 91–94
See application file for complete search history.

(56) References Cited

U.S. PATENT DOCUMENTS

| | | |
|---|---|---|
| 680,974 A | 8/1901 | Healey |
| 2,908,248 A | 10/1959 | Brant |
| 3,103,235 A | 9/1963 | Stringham, III |
| 3,114,395 A | 12/1963 | Immel |
| 3,618,639 A * | 11/1971 | Daley ............... E21B 33/1243 138/93 |
| 3,902,528 A * | 9/1975 | Tartabini ............... G01M 3/005 138/90 |
| 4,245,970 A | 1/1981 | St. Onge |
| 4,780,072 A * | 10/1988 | Burnette ............... B29C 33/485 118/205 |
| 4,818,144 A | 4/1989 | Mraz |
| 4,827,984 A | 5/1989 | Young et al. |
| 5,282,494 A | 2/1994 | Elgar et al. |
| 5,287,893 A | 2/1994 | Elgar et al. |
| 5,327,924 A | 7/1994 | Elgar et al. |
| 5,379,803 A | 1/1995 | Elgar et al. |
| 5,527,445 A * | 6/1996 | Palumbo ............... C25D 5/18 205/103 |
| 5,878,784 A | 3/1999 | Sales et al. |
| 6,131,441 A | 10/2000 | Berube et al. |
| 6,467,336 B1 | 10/2002 | Gotowik |
| 6,568,429 B2 * | 5/2003 | Lundman ............... F16L 55/134 138/91 |
| RE44,796 E | 3/2014 | Czaplicki et al. |

* cited by examiner

*Primary Examiner* — Vishal Pancholi
(74) *Attorney, Agent, or Firm* — Seth L. Hudson; Clements Benard Walker, PLLC

(57) ABSTRACT

The present invention provides methods and systems for an upstream pipe plug that includes a first bulkhead, a second bulkhead, a vent pipe engaged to the second bulkhead, and an insertion pipe engaged to the second bulkhead.

17 Claims, 3 Drawing Sheets

UPSTREAM PIPE PLUG

FIELD OF THE INVENTION

The present invention relates generally to an apparatus and method for sealing a pipe, and more generally relates to an apparatus and method that is inserted into a pipe for sealing a break, puncture, hole, or the like that has occurred to a pipe that may or may not be still functioning.

BACKGROUND OF THE INVENTION

Pipelines come in all shapes and sizes and are used to transport gas and fluids. These pipelines can transport stormwater, gas, sewer, sewer pipe or the like, and generally these pipelines transport large amounts of gas and fluids from one location to another. Sometimes these pipes can carry gas and fluids that are hazardous or environmentally unsafe.

The pipelines may be made of ductile iron, metal or CMP corrugated metal pipe (steel or iron, for example, but not limited to these), concrete, plastic, fiberglass, asbestos, ceramic, and the like is disposed underground, under structures, or in inaccessible areas, such as under rivers or ponds. Due to mechanical harm, premature wear, manufacturing defects, corrosion, erosion, adverse operating conditions, these pipelines may deteriorate and develop cracks. Once the crack develops, the gas or liquid contained therein seep out of the pipeline and into the surrounding areas. This unexpected discharge may be unsafe to individuals nearby or harmful to the surrounding environment.

In addition to cracks that may be developed in the pipe, defective joints between adjacent lengths of pipe may develop, where the lengths of pipe have shifted apart, causing leakage. Additionally, prolonged flow of a gas or liquid through the pipe may result in sealing material being carried away from a joint, and gaps or defective seals develop, causing leaking When a pipe breaks or seal separates, causing the gas or liquid to leak, a quick, reliable repair is necessary. It is usually not practical to uncover a buried pipe to repair the leak or replace that section of the pipe. This type of replacement is potentially dangerous, costly, and time consuming. Many leaks affecting the public health or environment must be stopped immediately, so as not to cause further harm and damage.

The present invention solves this issue and allows a leaking section of a pipe to be sealed, thus preventing any leakage. The present invention consists of an upstream pipe plug that is inserted into a pipeline and positioned within the pipe where the leak is located. Cement, or like sealing material, is pumped into the upstream pipe plug to seal the pipe, thus preventing any additional leakage. The present invention is a cost effective, safe, and expeditious way of sealing a pile and preventing further leakage.

BRIEF SUMMARY OF THE INVENTION

According to an embodiment of the present invention, the upstream pipe plug includes a first bulkhead, a second bulkhead, a vent pipe engaged to the second bulkhead, and an insertion pipe engaged to the second bulkhead.

According to another embodiment of the present invention, the upstream pipe plug includes at least one cable with a first end engaged to the first bulkhead and a second end engaged to the second bulkhead.

According to yet another embodiment of the present invention, the upstream pipe plug includes a first bulkhead that includes a first panel and a second panel.

According to yet another embodiment of the present invention, the upstream pipe plug includes a second bulkhead that includes a first panel and a second panel.

According to yet another embodiment of the present invention, the upstream pipe plug includes a drain pipe extending between the first bulkhead and the second bulkhead.

According to yet another embodiment of the present invention, the upstream pipe plug includes an inflatable bladder disposed on an outer circumference of the first bulkhead.

According to yet another embodiment of the present invention, the upstream pipe plug includes an air vent disposed on the first bulkhead.

According to yet another embodiment of the present invention, the upstream pipe plug includes a first bulkhead having an outer circumference and a first side and a second side, a second bulkhead having a first side and a second side that is spaced apart from the first bulkhead, an inflatable bladder disposed on the outer circumference of the first bulkhead, a vent pipe engaged to the second bulkhead, and an insertion pipe engaged to the second bulkhead.

According to yet another embodiment of the present invention, the upstream pipe plug includes at least two cables having a first end and a second end wherein the first end is engaged to the first bulkhead and the second end is engaged to the second bulkhead.

According to yet another embodiment of the present invention, the upstream pipe plug includes a first bulkhead that comprises a first panel and a second panel with at least one joist disposed between the first panel and the second panel.

According to yet another embodiment of the present invention, the upstream pipe plug includes a second bulkhead that comprises a first panel and a second panel with at least one joist disposed between the first panel and the second panel.

According to yet another embodiment of the present invention, the upstream pipe plug includes an air vent disposed on the first bulkhead.

According to yet another embodiment of the present invention, the upstream pipe plug includes a drain pipe that protrudes through the first bulkhead from the first side to the second side and extends to the second bulkhead and protrudes through the second bulkhead from the first side to the second side.

According to yet another embodiment of the present invention, a method of sealing a broken pipe that includes providing an upstream pipe plug with a first bulkhead, a second bulkhead, a vent pipe engaged to the second bulkhead, and an insertion pipe engaged to the second bulkhead. The first bulkhead is inserted into the pipe and the second bulkhead is inserted into the pipe, such that the first bulkhead and the second bulkhead are in a spaced apart arrangement, including a space between the first bulkhead and the second bulkhead. The first bulkhead and second bulkhead are moved within the pipe, such that the space between the first bulkhead and the second bulkhead is located over the break in the pipe. Concrete is then inserted through the insertion pipe within the space between the first bulkhead and the second bulkhead. The air contained in the space between the first bulkhead and the second bulkhead is exhausted through the vent pipe as the concrete is inserted through the insertion tube.

According to yet another embodiment of the present invention, the upstream pipe plug includes at least two rollers on the first bulkhead for rolling the first bulkhead through the pipe.

According to yet another embodiment of the present invention, the upstream pipe plug includes a drain pipe for allowing a liquid or a gas that is proceeding through the pipe to pass between the first bulkhead and the second bulkhead through the drain pipe.

According to yet another embodiment of the present invention, the upstream pipe plug includes an inflatable bladder on the first bulkhead and inflation of the inflatable bladder.

According to yet another embodiment of the present invention, the upstream pipe plug includes providing a valve on the insertion pipe and controlling the flow of concrete.

According to yet another embodiment of the present invention, the upstream pipe plug includes providing at least one cable and securing the first bulkhead to the second bulkhead with a cable.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
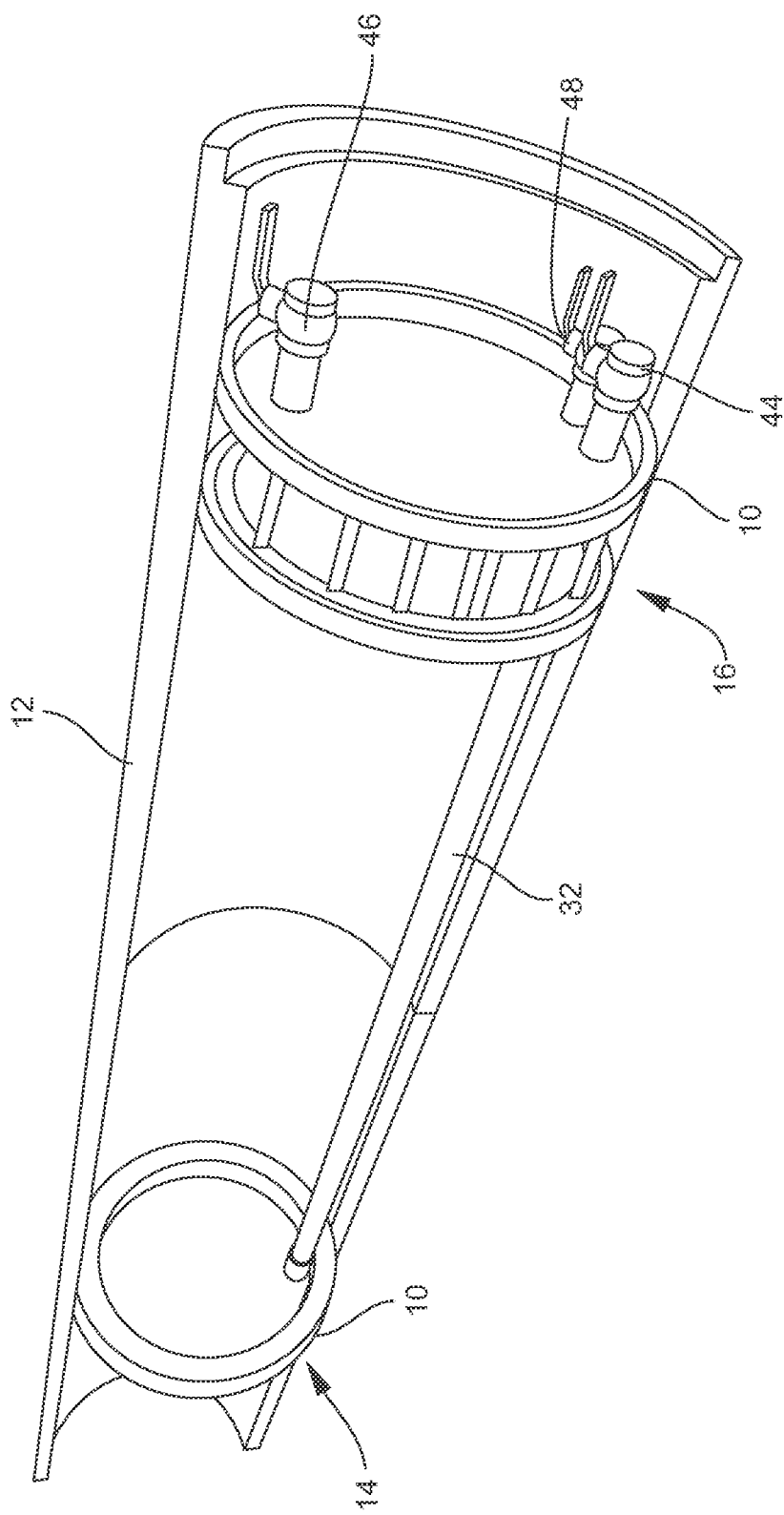
FIG. 1 is a back perspective view of the upstream pipe plug disposed in a pipe.
Figure 2:
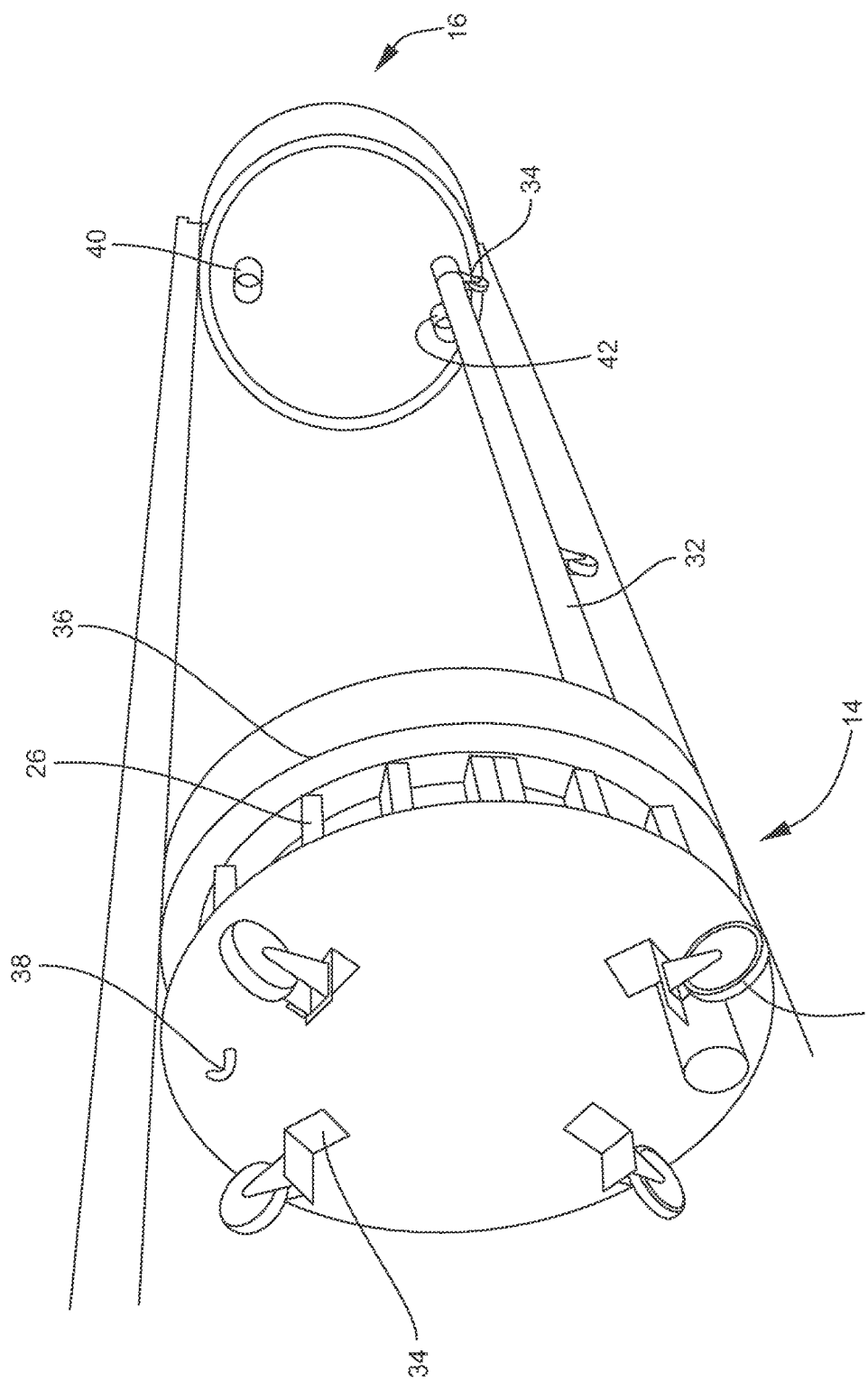
FIG. 2 is a front perspective view of the upstream pipe plug disposed in a pipe.
Figure 3:
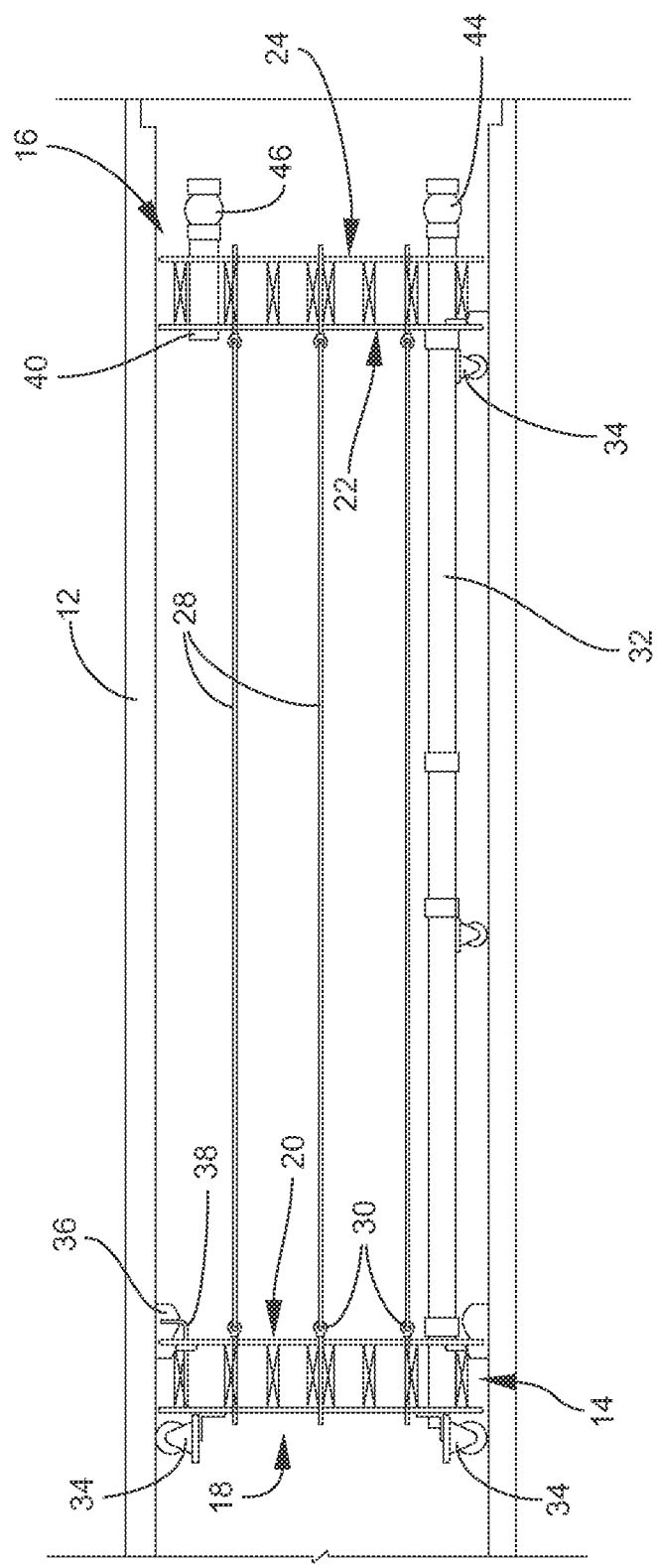
FIG. 3 is a side view of the upstream pipe plug disposed in a pipe.

Referring now specifically to the drawings, an upstream pipe plug is illustrated in FIGS. 1-3 and is shown generally at reference numeral 10. The upstream pipe plug 10 is designed to fit within a pipe, such as a 4 foot inner diameter stormwater or discharge pipe 12. Of course one skilled in the art would realize that the upstream pipe plug 10 could be made to fit within any size pipe from about 4 inches to 12 foot inner diameter, or even larger. Most stormwater pipe is about 3-8 foot inner diameter. Concrete is the most employed material for manufacturing a stormwater pipe, although other materials such as ductile iron, metal or CMP corrugated metal pipe (steel or iron, for example, but not limited to these), concrete, plastic, fiberglass, asbestos, ceramic, and the like are also known.

The upstream pipe plug 10 has two bulkheads, a first bulkhead 14 and a second bulkhead 16, and each bulkhead is preferably constructed from wood, although other materials may be employed such as concrete, cement, plastic, fiberglass, ceramic, steel, aluminum, carbon fiber and the like. Each bulkhead must be sufficiently strong to withstand the external pressures on it. Thus the pressure on a 4 inch pipe normally is considerably less than the pressure of water for a 4 foot inner diameter bulkhead, but each situation must be independently evaluated and engineered for the circumstances. Actually each bulkhead 14, 16 is slightly smaller than the inner diameter of the pipe 12, so that it will easily fit within the pipe 12.

As illustrated with the present invention, each bulkhead 14, 16 consists of 2 circular plywood panels 18, 20 and 22, 24, respectively, cut slightly smaller than the diameter of the pipe. Of course if the pipe has a cross-section other than circular, the bulkhead is sized and cut to accommodate the cross-sectional shape of the pipe 12. Between each plywood panel (18, 20 and 22, 24) is bracing, such as 2×10 wooden panel 26 and the plywood panels 18, 20, 22, 24 are securely fasten to the wooden joists 26. The number of wooden joists 26 and their location is a matter of design choice depending upon the engineered requirements. Preferably the plywood panels 18, 20, 22, 24 are screwed to the joists 26, but nails or glue are other means to secure together the panels and joists are also acceptable. The joists 26 may also be constructed of concrete, cement, plastic, fiberglass, ceramic, steel, aluminum, carbon fiber and the like.

Each bulkhead is secured to one another by cables 28. The cables 28 may be made from steel or other metal, plastic such as polyester or nylon, or ceramic, or fiberglass. The cables 28 are secured to the bulkhead by any suitable means such as by eyebolts 30 that preferably extend thru both plywood panels 22, 24 of each bulkhead 14, 16. The number and placement of the cables 28 depends on the engineering requirements. When the upstream pipe plug 10 is positioned at the insertion point, the cables 28 make certain it is in alignment with the pipe 12 and that the first bulkhead 14 and second bulkhead 16 remain parallel to one another. Further the cables 28 help insure that neither bulkhead 14, 16 will be blown out under pressure from concrete that is pumped into the space between the bulkheads 14, 16, as later described. Each bulkhead 14, 16 is also held in alignment with one another by means of a drain pipe 32 securely fastened to each bulkhead 14, 16. The drain pipe 32 can be made from any materials mentioned above with respect to the pipe 12. Preferably the drain pipe 32 is made of steel and is positioned such that it is near the bottom the upstream pipe plug 10, when the upstream pipe plug is inserted into the pipe 12. The drain pipe 32 extends thru both bulkheads 14, 16 such that there is a fluid connection from one side of the upstream pipe plug 10 to the other side. In that manner the drain pipe 32 can drain the liquid near the bottom of the pipe 12, even after cementing the upstream pipe plug 10 into place within the pipe 12. To help support the drain pipe 32, at various intervals along the length of the drain pipe 32, it is secured to rollers or wheels 34 such that the rollers or wheels 34 travel along the pipe 12. Additionally rollers or wheels 34 are also secured at least to one bulkhead 14, 16, and as illustrated in FIGS. 2 and 3 the rollers or wheels 34 are secured to the first bulkhead 14, to allow the bulkhead 14 to roll along the insides of the pipe 12 and to center the bulkhead 14 within the pipe 12. Optionally, the second bulkhead 16 may also have rollers or wheels 34 on it to also keep the upstream pipe plug 10 in alignment with the pipe 12.

Bulkhead 14 is inserted into the pipe 12 first. It has an inflatable rubber bladder 36 around either the outer 18 or inner 20 plywood panel of the first bulkhead 14. Preferably the inflatable rubber bladder 36 is positioned around the outer circumference of the inner plywood panel 20 of the first bulkhead 14 to effectively seal the space upstream of the first bulkhead 14 from the space between the bulkheads 14, 16. The inflatable bladder 36 may be constructed from natural isoprene rubber, or synthetic rubber such as styrene butadiene rubber, polyisoprene rubber, chloroprene rubber, butylene rubber, ethylene propylene diene rubber, acrylonitrile butadiene rubber, polyacrylate rubber, or ethylene acrylate rubber, to name a few.

Lastly there is an air vent 38 in the first bulkhead 14 near the very top of the bulkhead 14 to allow air to escape from the space between the bulkheads 14, 16 to the space upstream of the first bulkhead 14, or vice versa, depending on the environment. Likewise there is a bigger vent pipe 40 from one side to the other side of the second bulkhead 16 (the last bulkhead inserted into the pipe 12). More air escapes from this bigger vent pipe 40 than from the air vent pipe 38. Finally there is an insertion pipe 42 that extends through the second bulkhead 16 to fluidly communicate with the space between the two bulkheads from the downstream side to the broken pipe 12. The drain pipe 32, vent pipe 40 and the insertion pipe 42 have valves 44, 46, and 48 respectively, positioned outside the second bulkhead 16 (outside of the upstream pipe plug 10) at the end of their respective pipes such that they may be closed off when desired.

In operation, the upstream pipe plug 10 is first inserted into the broken or cracked pipe 12, by inserting the first bulkhead 14. As the upstream pipe plug 10 travels inside the pipe 12, the air vent 38 allows some air in the space upstream of the first bulkhead 14 to transfer to space downstream of the first bulkhead 14—toward the second or last bulkhead 16. This assures easy insertion—no air resistance. As the last bulkhead 16 is inserted into the pipe 12, and moved into the area of the break or crack, any air that that transfers through the air vent 38 from upstream of the first bulkhead 14 to the space between the bulkheads 14, 16 now exits out the vent pipe 40 in the last bulkhead 16. Also neither bulkhead 14, 16 is a tight fit and therefore air can travel around either bulkhead 14, 16 in the upstream or downstream direction. This also insures easy insertion of the upstream pipe plug 10 into the broken pipe 12.

Once the upstream pipe plug 10 is positioned so that the space between the bulkheads 14, 16 is positioned under the break in pipe 12, the inflatable rubber bladder 36 is inflated by means of an air hose (not shown) that traverses through the plug and disconnects at the downstream or discharge end bulkhead. The air hose remains in the plug permanently. A quick disconnect coupling is engaged to the downstream or discharge end of the air hose for detachment. This seals the first bulkhead 14 from the space upstream of the first bulkhead and seals concrete introduced between the bulkheads 14, 16 from traversing beyond the first bulkhead 14 in the space upstream of the first bulkhead 14. A sealing material, such as concrete is now introduced through the insertion pipe 42. Because the sealing material can be very heavy, it naturally fills the space between the bulkheads 14,16, driving air out through the vent pipe 40, until it fills the space between bulkheads 14,16 to capacity and begins to exit out the vent pipe 40 too. At this point a pump (not shown) that is used to pump the sealing material is turned off and the valves 46 and 48 on the vent pipe 40 and insertion pipe 42 are closed. After the requisite time, the sealing material hardens, effectively sealing the broken pipe 12. Liquid or gas can still drain through the pipe 12 via drain pipe 32. If necessary, valve 44 may be closed such that the gas or liquid may not drain through drain pipe 32 and the pipe 12 remains sealed for all fluids.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An upstream pipe plug having a first side and a second side for insertion into a pipe, comprising:
    a first bulkhead composed of two circular panels having a cross-sectional shape of the pipe;
    a second bulkhead composed of two circular panels having a cross-sectional shape similar to that of the pipe;
    a vent pipe engaged to the second bulkhead;
    a drain pipe engaged to the first bulkhead and the second bulkhead and establishing a fluid connection from the first side of the pipe plug to the second side of the pipe plug;
    wheels engaged to the drain pipe at intervals along the length of the drain pipe;
    and
    an insertion pipe engaged to the second bulkhead.

2. The upstream pipe plug of claim 1, further comprising at least one cable with a first end engaged to the first bulkhead and a second end engaged to the second bulkhead.

3. The upstream pipe plug of claim 1, further comprising bracing between the two circular panels of the first bulkhead and bracing between the two circular panels of the second bulkhead.

4. The upstream pipe plug of claim 1, further comprising at least two rollers disposed on the second bulkhead.

5. The upstream pipe plug of claim 1, further comprising at least two rollers disposed on the first bulkhead.

6. The upstream pipe plug of claim 1, further comprising an inflatable bladder disposed on an outer circumference of the first bulkhead.

7. The upstream pipe plug of claim 1, further comprising an air vent disposed near a top of the first bulkhead.

8. An upstream pipe plug for insertion into a pipe, comprising:
    a first bulkhead composed of two panels having a cross-sectional shape of the pipe;
    a second bulkhead composed of two panels having a cross-sectional shape of the pipe,
    wherein the second bulkhead is spaced apart from the first bulkhead;
    an inflatable bladder disposed on the outer circumference of the first bulkhead;
    a vent pipe engaged to the second bulkhead;
    a drain pipe engaged to the first bulkhead and the second bulkhead and establishing a fluid connection from the first side of the pipe plug to the second side of the pipe plug;

wheels engaged to the drain pipe at intervals along the length of the drain pipe;
and
an insertion pipe engaged to the second bulkhead.

9. The upstream pipe plug of claim 8, further comprising at least two cables having a first end and a second end, wherein the first end is engaged to the first bulkhead and the second end is engaged to the second bulkhead.

10. The upstream pipe plug of claim 8, wherein the first bulkhead comprises a first panel and a second panel with bracing disposed between the first panel and the second panel.

11. The upstream pipe plug of claim 8, wherein the second bulkhead comprises a first panel and a second panel with bracing disposed between the first panel and the second panel and the first panel and second panel are fastened to the bracing.

12. The upstream pipe plug of claim 8, wherein an air vent is disposed on the first bulkhead.

13. A method of sealing a broken pipe, comprising:
providing an upstream pipe plug comprising a first bulkhead, a second bulkhead, a vent pipe engaged to the second bulkhead, a drain pipe engaged to the first bulkhead and the second bulkhead and establishing a fluid connection from the first side of the pipe plug to the second side of the pipe plug, wheels engaged to the drain pipe at intervals along the length of the drain pipe, and an insertion pipe engaged to the second bulkhead;
inserting the first bulkhead into the pipe;
inserting the second bulkhead into the pipe, such that the first bulkhead and second bulkhead are in a spaced apart arrangement, including a space between the first bulkhead and the second bulkhead;
moving the first bulkhead and the second bulkhead within the pipe, such that the space between the first bulkhead and second bulkhead is located near the break in the pipe and the first bulkhead and the second bulkhead are disposed on either side of the break;
inserting concrete through the insertion pipe within the space between the first bulkhead and the second bulkhead; and
exhausting air contained within the space between the first bulkhead and the second bulkhead through the vent pipe as the concrete is inserted through the insertion tube.

14. The method of sealing a broken pipe of claim 13, further comprising providing at least two rollers on the first bulkhead for rolling the first bulkhead through the pipe.

15. The method of sealing a broken pipe of claim 13, further comprising providing an inflatable bladder on the first bulkhead and inflating the inflatable bladder.

16. The method of sealing a broken pipe of claim 13, further comprising providing a valve on the insertion pipe and controlling the flow of concrete.

17. The method of sealing a broken pipe of claim 13, further comprising providing at least one cable and securing the first bulkhead to the second bulkhead with a cable.

* * * * *